Sept. 11, 1951  R. A. GAISER ET AL  2,567,331
METHOD OF APPLYING ELECTRICALLY CONDUCTING
COATINGS TO VITREOUS BASES
Filed July 21, 1949
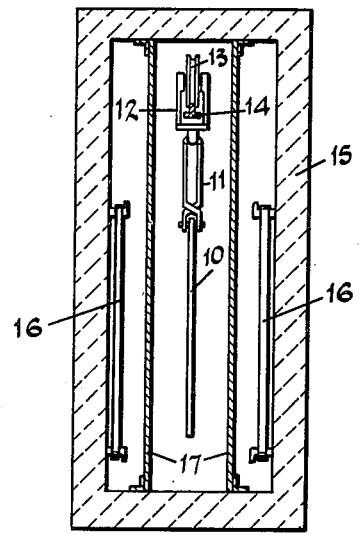
Fig. 1
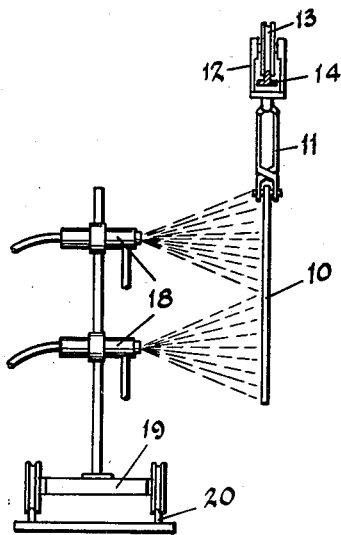
Fig. 2
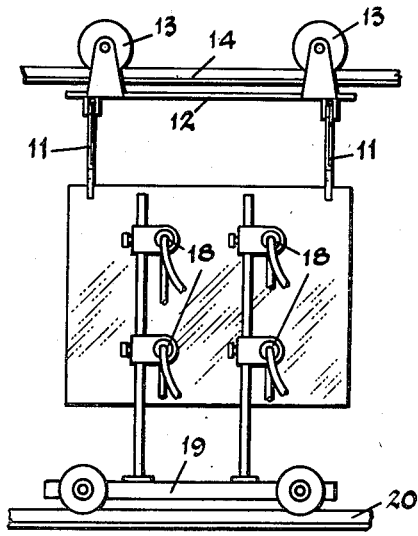
Fig. 3
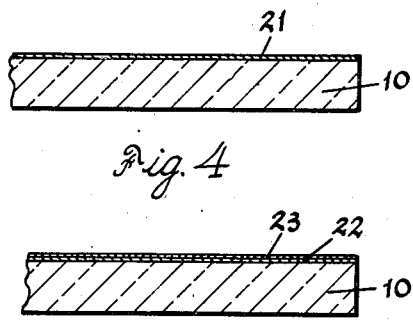
Fig. 4
Fig. 5
INVENTORS
Romey A. Gaiser and
BY James W. McAuley
Nobbe & Swope
ATTORNEYS Patented Sept. 11, 1951

2,567,331

UNITED STATES PATENT OFFICE 2,567,331

METHOD OF APPLYING ELECTRICALLY CONDUCTING COATINGS TO VITREOUS BASES

Romey A. Gaiser, Toledo, and James W. McAuley, Perrysburg, Ohio, assignors to Libbey-Owens-Ford Glass Company, Toledo, Ohio, a corporation of Ohio Application July 21, 1949, Serial No. 106,050

14 Claims. (Cl. 117—54)

The present invention relates to electrically conducting films, and more particularly to transparent electrically conducting films on glass or vitreous surfaces.

Transparent, substantially colorless, electrically conducting films of what is believed to be tin oxide have already been produced by the reaction of tin halides on hot glass and such films have proven commercially satisfactory for the deicing of aircraft windshields and in many other places where both transparency and electrical conductivity are required.

Briefly stated, the present invention is based on the discovery that transparent electrically conducting films of this same general character, but which have improved optical properties and better uniformity of electrical resistance, can be produced by exposing glass or other vitreous bodies that have been heated to substantially their point of softening to the action of organic tin compounds.

Films produced in this way may be made of sufficient thickness to, themselves, have the required electrical conductivity, or they may be applied as very thin films to provide a base coat in producing novel compound or multiple layer films having greater electrical conductivity and even better optical qualities.

It is therefore a primary object of this invention to produce a transparent electrically conducting film of improved optical and electrical characteristics by the contact of an organic tin compound with a hot vitreous surface.

Another object is the provision of a method of producing a multilayer electrically conducting film, having similar or more greatly improved characteristics, by first subjecting a heated glass or other vitreous surface to the action of an organic tin compound for a very short period and then subjecting the surface so treated to the reaction of a tin halide for a relatively longer period.

Another object is to provide, on a vitreous surface, an electrically conducting film that is the product of the thermal decomposition of an organic tin compound at a temperature approximating the softening temperature of said surface.

Still another object is the provision of a multilayer electrically conducting film on the surface of a vitreous body in which the undercoat is a mono or polymolecular layer of a product of the thermal decomposition of an organic tin compound at substantially the softening temperature of said body, and in which the overcoat is a relatively thicker layer of the reaction product of a tin halide at substantially the same temperature.

Other objects and advantages of the invention will become more apparent during the course of the following description, when taken in connection with the accompanying drawings.

In the drawings, wherein like numerals are employed to designate like parts throughout the same:

Fig. 1 is a transverse, vertical section through a furnace within which a glass sheet or other vitreous body can be heated prior to filming;

Fig. 2 is a side elevation of a spray apparatus for applying the film or films of the invention to the heated sheet;

Fig. 3 is a rear elevation of the spray apparatus, showing the sheet in position for spraying;

Fig. 4 is a fragmentary sectional view of a glass sheet provided with the single layer of film of the invention; and Fig. 5 is a fragmentary sectional view of a glass sheet provided with the multiple layer film of the invention.

Referring now more particularly to the drawings, there has been illustrated in Figs. 1 to 3 one form of apparatus which can be employed in producing the special film of this invention.

As indicated above, this film results from the action of an organic tin compound on the surface of a vitreous body that has been heated to substantially its point of softening, and the compound may be applied to a glass sheet, for example, by any of the known spraying, dipping, or fuming methods that are applicable.

However, the spray method is preferred, and the invention will be described in this connection here. Thus, as indicated in the drawings, a properly cleaned glass sheet 10 is suspended from tongs 11 which are hung from a carriage 12, provided with wheels 13, running on a monorail 14. The carriage 12 is then moved along the rail 14, into a furnace 15, within which it can be heated to the temperature desired for filming.

The furnace 15 may be heated in any suitable manner, such as by means of electrical resistance heaters 16, and may be provided with baffles 17 in front of the heaters to provide a more uniform heating over the entire area of the sheet 10.

Within the furnace, the sheet 10 is heated to substantially the softening point of the glass. Actually, of course, glass varies and has no precise softening point and, for this reason, it is not practicable to give any exact temperature requirements for the heating step that will be applicable to all types of glass and other vitreous bodies.

However, in filming 1/8" automotive plate glass, such as is illustrated in the drawings, and which is a soda-lime-silica glass, we prefer to heat it for two minutes at 1200 degrees Fahrenheit, and immediately after it is withdrawn from the furnace, to position it before the spray guns 18, where it is sprayed with an organic tin compound, and preferably with a solution of the compound.

Any of the organic tin compounds may be used. At present they are not easily available commercially, but we have obtained and tested all of the following: dibutyl tin diacetate, dibutyl tin dilaurate, dibutyl tin oxide, dibutyl diphenyl tin, dilauryl tin dichloride, dibutyl tin dichloride, diphenyl tin dichloride, dibutyl tin ethylate, tin oleate, tetraphenyl tin, tetrabutyl tin, and dibutyl tin diethylate.

While some difficulty was encountered in the handling of certain of the organic tin compounds, all of them produce an electrically conducting film when applied to glass that has been heated to substantially its point of softening. Dibutyl tin diacetate was found to be particularly suited for the purpose, and most of our recent work has been done with this compound.

The organic tin compound may be sprayed alone, but, generally speaking, we prefer to apply it in a suitable solvent such as isopropyl alcohol; first, for reasons of economy and, second, because the solution appears to give better light transmission, reflection and absorption characteristics than do the organic tin compounds alone.

The content of the alcohol in the spray solution may be varied from 0% to roughly 98% with excellent results, and a wide range of light transmission values can be obtained in the film by the use of the organic tin compounds.

To illustrate, using 100% dibutyl tin diacetate alone as the filming spray, electrically conducting films have been obtained which have the following characteristics:

| Transmission | Reflection | Absorption |
|---|---|---|
| 58% | 20% | 22% |

However, if the concentration of the tin compound in the spray is changed slightly, as for instance by employing a solution made up of 91% dibutyl tin diacetate in 9% isopropyl alcohol, films exhibiting characteristics as follows have been produced:

| Transmission | Reflection | Absorption |
|---|---|---|
| 71% | 9% | 20% |

And thin films have been produced with a solution of 2% dibutyl tin diacetate in 98% isopropyl alcohol which have the following superior light characteristics:

| Transmission | Reflection | Absorption |
|---|---|---|
| 90% | 9% | 1% |

It should be understood that the above values have been recorded on glass sheets before they were laminated, and that if these same sheets are laminated with another sheet of glass and a non-brittle plastic interlayer the transmissions will be increased and the reflections will be decreased.

In order to obtain a uniform coating of the spray solution over the sheet 10, it is desirable to reciprocate the spray back and forth over the sheet, and for this purpose the spray guns 18 are mounted on a wheeled carriage 19 running on tracks 20. The carriage 19 is moved back and forth over the tracks 20 a sufficient number of times to give a film of the desired thickness on the glass sheet, as shown exaggerated in thickness at 21 in Fig. 3. The filmed sheet is then preferably cooled in the atmosphere, at room temperature, after which it is ready for use.

The exact chemical action that takes place at the glass-air interface, when the organic tin compound strikes the hot glass, is not completely understood, but we believe that the film formed on the glass surface is the stannic oxide which is a product of the thermal decomposition of the organic tin compound at the temperature of the glass being sprayed. Thus, it seems probable that a primary reaction such as shown below may take place during filming:

$$(C_4H_9)_2Sn(C_2H_3O_2)_2 \rightarrow SnO_2 + 2(C_4H_9COCH_3)$$

At any rate, regardless of the exact nature of the action of the spray, or the exact chemical nature of the film, this film is transparent, has an electrical resistivity that is many millions of times less than that of the glass itself, and exhibits distinct advantages over films of this character that have been heretofore produced.

For example, as explained above, practically all of the transparent electrically conducting films of tin oxide that have previously been produced commercially have been made by reacting a tin halide, and specifically stannic tetrachloride, with hot glass. Now one of the reaction products that are present when stannic tetrachloride is sprayed onto hot glass is hydrochloric acid, and it has recently been discovered that anhydrous hydrochloric acid will film hot glass and, moreover, that the HCl gas present during filming with a tin halide causes permanent cloud or haziness in the film. Such haze interferes with the optical clarity of the film and is particularly objectionable when the film is to be used in airplane windshields, optical viewing instruments and similar locations where clarity of vision is a prime requisite, and the complete elimination of HCl vapor from the scene of reaction at the glass-air interface when spraying with stannic chloride presents a very difficult problem.

However, when the organic tin compound spray of the present invention is employed, hydrochloric acid is not present and any reaction products formed are of a chloride-free nature. As a result when practicing our invention the film of stannic oxide can be formed on the hot glass surface in the absence of any additional film formers such as HCl which would cause fog or haze.

In addition to producing a haze-free film, there is evidence to show that the spray material of this invention will also produce a film that has better uniformity of electrical resistance. There is a logical explanation for this because the $SnO_2$ film formed from the organic tin compound can be pictured as being more continuous than one formed from stannic chloride when consideration is given to interferring chloride films in the latter which are visible as haze because the continuity of the $SnO_2$ films formed from stannic chloride must be interrupted by chloride films in the tin oxide film structure.

Consequently, hot spots and voltage breakdowns that occur in use, with films formed from stannic chloride, can be reduced by forming the films from the organic tin compound of this invention.

At the present time there are two minor objections to the use of organic tin compounds as the spray material in the production of electrically conducting films. These are, first, that the cost of the material is greater than the cost of stannic chloride, and second, that the color of the film produced with dibutyl tin diacetate, in thickness sufficient to give resistivities of the order required for deicing aircraft windshields, for example (around 100 ohms), appears to be of a different nature than the one produced by stannic chloride, having decreased light transmission and a more brownish appearance.

However, we have discovered that we can produce a compound or multilayer film, produced by the successive spaying, first with an organic tin compound, and then with a tin chloride, which film will combine the freedom from haze that is characteristic of the films formed from organic tin compounds with the feature of low resistance coupled with comparative freedom from color that is characteristic of the tin chloride formed films, while at the same time having additional advantages over films produced from either of these film forming substances alone.

The technique for producing these multilayer films is similar to that described above for filming with the organic tin compound alone. The glass is cleaned and then passed into the furnace 15 which is preferably maintained at 1200 degrees Fahrenheit. The glass remains in the furnace for a sufficient length of time, depending on its thickness, for the surface to be heated to substantially its point of softening, after which it is moved into position to be sprayed.

In producing the base layer of the film, any desired concentration of dibutyl tin diacetate can be used in the spray solution. However, in commercial practice, we prefer to employ a 90% isopropanol-10% dibutyl tin diacetate solution as best suited from a practical standpoint to spray a film of the desired thickness in the time allotted. The important point is to use a concentration and a length of spraying time sufficient to produce a mono or polymolecular layer (that is, a layer only a few molecules thick) of $SnO_2$ on the glass surface. With the solution given above, the spray guns 18 are reciprocated back and forth for a period of approximately 3 seconds to achieve the desired result.

Spray guns feeding 10% $SnCl_4$ in isopropanol are then reciprocated back and forth to spray the same surface for approximately 30 seconds to produce the top layer 23, after which the glass is allowed to cool to ambient temperatures.

Separate spray guns may be used to successively spray the two different solutions, or they may be sprayed from the same guns. However, we prefer to feed the dibutyl tin diacetate solution to the two vertically aligned guns shown at the left of Fig. 3 and to feed the tin chloride solution to the two vertically aligned guns shown at the right in this figure. When this is done, the carriage 19 is moved first to the left and then reciprocated rapidly back and forth to cover the entire sheet with each pass. The guns to the left may be first turned on while the ones to the right are off until the base coat is formed, after which the ones to the left are turned off and the ones to the right turned on to apply the top coat. In some cases a single pass may be sufficient to form a film of sufficient thickness for the base coat and, in this case, all four guns may be started at the same time and the two to the left turned off as soon as the first pass has been completed.

Regardless of how thin the base layer of $SnO_2$ formed from dibutyl tin diacetate is, the above technique will produce haze-free films, because a base film only one molecule thick will protect the glass surface from the action of hydrochloric acid vapor formed during subsequent spraying with tin chloride to form the top layer and, since the HCl cannot contact the glass after the base film is applied it cannot produce films of a chloride nature. Moreover, the multilayer films produced in this way will have good light transmission, unobjectionable light reflection, adequate electrical conductivity and, surprisingly enough, practically zero absorption.

To illustrate, commercial electrically conducting glass produced with the usual $SnCl_4$-isopropyl alcohol solution have been measured for light transmission, reflection and absorption, prior to laminating, for the past several years. Over this period these lites, in resistivities suitable for airplane deicing (approximately 100 ohms) have averaged:

| Transmission | Reflection | Absorption |
|---|---|---|
| 76 to 80% | 13 to 17% | 7 to 8% |

Now, however, using our special two-solution technique, we can produce electrically conducting glass falling in the resistivity range of approximately 100 ohms which have the following light characteristics:

| Transmission | Reflection | Absorption |
|---|---|---|
| 83.5 to 84.5% | 15 to 16% | 0 to 0.5% |

These films are so free from haze as to appear crystal clear. The films laminate as well as plain glass surfaces, and cold room tests at −43 degrees Fahrenheit, and of 84 hours duration have no effect on the laminations. In addition, overvoltage and overwattage tests have demonstrated that these multilayer films are at least equal, if not superior to, the $SnCl_4$ produced films.

It is to be understood that the forms of the invention herewith described are to be taken as illustrative embodiments only of the same, and that various procedural changes may be resorted to without departing from the spirit of the invention or the scope of the subjoined claims.

We claim:

1. The method of producing a transparent electrically conducting film on a vitreous surface which comprises heating said surface to approximately its point of softening and exposing the heated surface to the action of an organic tin compound in fluid form which will form an electro-conductive tin oxide coating when such compound is brought into contact with a heated vitreous base without the formation of HCl vapors.

2. The method of producing a transparent electrically conducting film on a vitreous surface which comprises heating said surface to approximately its point of softening, and then spraying the heated surface with a solution of an organic tin compound which will form an electroconductive tin oxide coating when such compound is brought into contact with a heated vitreous base without the formation of HCl vapors.

3. The method of producing a transparent electrically conducting film on a vitreous surface which comprises heating said surface to approximately its point of softening and exposing said heated surface to the action of dibutyl tin diacetate.

4. The method of producing a transparent electrically conducting film on a vitreous surface which comprises heating said surface to approximately its point of softening and spraying said heated surface with an alcohol solution of dibutyl tin diacetate.

5. The method of producing a transparent electrically conducting film on a vitreous surface which comprises heating said surface to approximately its point of softening, and then spraying the heated surface with dibutyl tin diacetate in from 0% to 98% of isopropl alcohol.

6. The method of producing a transparent electrically conducting film on a vitreous surface which comprises heating said surface to approximately its point of softening and exposing said surface first to the action of an organic tin compound in fluid form which will form an electroconductive tin oxide coating when such compound is brought into contact with a heated vitreous base without the formation of HCl vapors and then to a tin chloride compound in fluid form.

7. The method of producing a transparent electrically conducting film on a vitreous surface which comprises heating said surface to approximately its point of softening and exposing said heated surface first to the action of dibutyl tin diacetate and then to stannic tetrachloride.

8. The method of producing a transparent electrically conducting film on a vitreous surface which comprises heating said surface to substantially its point of softening, forming a polymolecular base layer of tin oxide on said surface by spraying for a short time with an organic tin compound which will form an electroconductive tin oxide coating when such compound is brought into contact with a heated vitreous base without the formation of HCl vapors, and then forming a relatively thick top layer by spraying said base layer for a longer time with a solution of a tin chloride.

9. The method of producing a transparent electrically conducting film on a vitreous surface which comprises heating said surface to substantially its point of softening, and then spraying said heated surface first with dibutyl tin diacetate in from 0% to 98% of alcohol and then with a solution of stannic tetrachloride.

10. The method of producing a transparent electrically conducting film on a vitreous surface which comprises heating said surface to substantially its point of softening, forming a polymolecular base layer of tin oxide on said surface by spraying the same with a solution of 10% dibutyl tin diacetate in 90% isopropanol for approximately 3 seconds, and then forming a top layer by spraying said base layer with a solution of 10% stannic tetrachloride in 90% isopropyl alcohol for 30 seconds.

11. A method according to claim 1 in which the organic tin compound which will form an electroconductive tin oxide coating when such compound is brought into contact with a heated vitreous base without the formation of HCl vaports is dibutyl tin dilaurate.

12. A method according to claim 1 in which the organic tin compound which will form an electroconductive tin oxide coating when such compound is brought into contact with a heated vitreous base without the formation of HCl vapors is dibutyl tin ethylate.

13. A method according to claim 1 in which the organic tin compound which will form an electroconductive tin oxide coating when such compound is brought into contact with a heated vitreous base without the formation of HCl vapors is dibutyl tin diethylate.

14. A method according to claim 1 in which the organic tin compound which will form an electroconductive tin oxide coating when such compound is brought into contact with a heated vitreous base without the formation of HCl vapors is diphenyl tin dichloride.

ROMEY A. GAISER.
JAMES W. McAULEY.

REFERENCES CITED

The following references are of record in the file of this patent:

UNITED STATES PATENTS

| Number | Name | Date |
| --- | --- | --- |
| 2,118,795 | Littleton | May 24, 1938 |
| 2,429,420 | McMaster | Oct. 21, 1947 |